US009665663B2

(12) United States Patent
Mika et al.

(10) Patent No.: US 9,665,663 B2
(45) Date of Patent: May 30, 2017

(54) GENERATING USER RECOMMENDATIONS

(71) Applicant: Yahoo! Inc., Sunnyvale, CA (US)

(72) Inventors: Peter Mika, Barcelona (ES); Roi Blanco, Barcelona (ES); Julia Hoxha, Karlsruhe (DE)

(73) Assignee: Yahoo! Inc., Sunnyvale, CA (US)

(*) Notice: Subject to any disclaimer, the term of this patent is extended or adjusted under 35 U.S.C. 154(b) by 26 days.

(21) Appl. No.: 14/573,756

(22) Filed: Dec. 17, 2014

(65) Prior Publication Data

US 2016/0179835 A1    Jun. 23, 2016

(51) Int. Cl.
*G06N 3/08* (2006.01)
*H04N 21/466* (2011.01)
*G06F 15/18* (2006.01)
*G06F 17/30* (2006.01)
*G06N 99/00* (2010.01)

(52) U.S. Cl.
CPC .... *G06F 17/3097* (2013.01); *G06F 17/30734* (2013.01); *G06F 17/30867* (2013.01); *G06N 99/005* (2013.01)

(58) Field of Classification Search
USPC .......................................................... 706/12
See application file for complete search history.

(56) References Cited

U.S. PATENT DOCUMENTS

| 8,135,707 | B2* | 3/2012 | Mika | G06F 17/30696 707/723 |
| 8,156,053 | B2* | 4/2012 | Mika | G06F 17/241 706/12 |
| 8,775,336 | B2* | 7/2014 | Blanco | G06F 17/30867 706/12 |
| 8,868,558 | B2* | 10/2014 | Blanco | G06F 17/30867 707/736 |
| 9,015,140 | B2* | 4/2015 | Wu | G06F 17/30867 707/706 |
| 9,367,633 | B2* | 6/2016 | Blanco | G06F 17/3087 |
| 2011/0106744 | A1* | 5/2011 | Becker | H04N 5/445 706/46 |

OTHER PUBLICATIONS

Learning Relevance of Web Resources across Domains to Make Recommendations Julia Hoxha; Peter Mika; Roi Blanco 2013 12th International Conference on Machine Learning and Applications Year: 2013, vol. 2 pp. 325-330, DOI: 10.1109/ICMLA.2013.144 IEEE Conference Publications.*

(Continued)

*Primary Examiner* — Michael B Holmes
*Assistant Examiner* — Nathan Brown, Jr.
(74) *Attorney, Agent, or Firm* — Berkeley Law & Technology Group, LLP

(57) ABSTRACT

Briefly, embodiments of methods and/or systems of providing relevant and diverse recommendations are disclosed. For one embodiment, as an example, a system may extract structured and/or semi-structured parameters from web resources obtained from interaction logs comprising records of browsing sessions. Content from extracted parameters may be compared, using an ontology, to find relationships among web resources and query resources.

14 Claims, 7 Drawing Sheets

(56) References Cited

OTHER PUBLICATIONS

On using reviews and comments for cross domain recommendations and decision making Mala Saraswat; Shampa Chakraverty; Namrta Mahajan; Nikita Tokas 2016 3rd International Conference on Computing for Sustainable Global Development (INDIACom) Year: 2016 pp. 3656-3659 IEEE Conference Publications.*

Semantic TagPrint—Tagging and Indexing Content for Semantic Search and Content Management Murat Kalender; Jiangbo Dang; Suzan Uskudarli 2010 IEEE Fourth International Conference on Semantic Computing Year: 2010 pp. 260-267, DOI: 10.1109/ICSC.2010.53 IEEE Conference Publications.*

A Short-term User Interest Model for personalized recommendation Jie Yu; Fangfang Liu 2010 2nd IEEE International Conference on Information Management and Engineering Year: 2010 pp. 219-222, DOI: 10.1109/ICIME.2010.5477448 IEEE Conference Publications.*

Hoxha, "Cross-domain Recommendations based on semantically-enhanced User Web Behavior," Karlsruher Institut fur Technologie, May 28, 2014, 231 Pages.

TechCrunch Website, "And the Winner of TechCrunch Disrupt NY 2014 Is . . . Vurb," http://techcrunch.com/2014/05/07/and-the-winner-of-techcrunch-disrupt-ny-2014-is-vurb/, 8 Pages.

TechCrunch Website, "BlueOrganizer 3.0: Instant Vertical Search and Tagging," http://techcrunch.com/2006/11/20/blueorganizer-launches-powerful-contextual-search/, 6 Pages.

TechCrunch Website, "Social Browsing Assistant Glue Adds Recommendations and Facebook Comments," http://techcrunch.com/2009/07/23/social-browsing-assistant-glue-adds-recommendations-and-facebook-comments/, 6 Pages.

Hoxha, et al, "Semantic Formalization of Cross-site User Browsing Behavior," 2012 IEEE/WIC/ACM International Conferences on Web Intelligence and Intelligent Agent Technology, 978-0-7695-4880-7/12, © 2012 IEEE, DOI 10.1109/WI-IAT.2012.232, pp. 488-495.

* cited by examiner

*FIG. 6*                                                                 600

Process 1: Formalization of Web Browsing Behavior
Require: Web browsing session $S = \{s; T_s; T_e; U\}$, s.t. $s = \langle e_1, e_2, ..., e_n \rangle$ is the ordered sequence of events, U user identifier, $T_s$ is the starting time and $T_e$ ending time of session S.
Ensure: ABox assertions $A$
1: $A = \emptyset$
2: $j = 1$
3: for all $e_i \in s$, do
4: $e_i = (l, T, P, t)$ with URL $l$, initially empty set of class types $T$ and parameters set $P$, and event occurrence time $t$
5: $b = extractBaseUrl(l)$
6: Assertions $\alpha_e = \{$Event$(e_i)$, EventURL$(e_{i\_url})$, hasURL$(e_i, e_{i\_url})$, fullURL$(e_{i\_url}, e_i.l)$,
    baseURL$(e_{i\_url}, b)$, hasTime$(e_i, convertTime(ei,t))$, order$(e_i, j++)\}$
7: //Resource assertions
8: Assertions with HTML Markup Data $\alpha_r = assertSemResMD(e_i, b)$
9: $A = A \cup \alpha_e \cup \alpha_r$
10: end for
11: //Session-related assertions
12: $S_{id} = sid(T_s, U)$
13: $\alpha_s = \{$Session$(S_{id})$, User$(user\_U)$, userID$(user\_U, U)$,
    hasUser$(id_S, user\_U)$, hasStartEvent$(S_{id}, e_1)$, hasEndEvent$(S_{id}, e_n)\}$
14: $A = A \cup \alpha_s$

Process 2: Resource assertions assertSemResMD($e_i, b$) with Markup Data
Require: Event $e_i$ and its corresponding base URL $b$
Ensure: ABox assertions $\alpha_r$ for the identified resource and its content types
//Semantic Resource Identification
1: RDF representation D = *extractRDF($e_i$, l)*
2: Extract resources *R=extractResources($e_i$, l, D)*
3: Identify for $e_i$ a mapping resource $R_l$=*entityResolution($e_i$, D)*
4: Assertion $\alpha_r$ = {hasURI($e_i$, $R_l$)}
//Semantic Types
5: Identify schemas *S= getSchemas(D)*
6: For resource $R_l$ find its types $T_r$=*resourceClassification($R_l$, S)*
7: for all $T \in Tr$ do
8: $\alpha_r = \alpha_r \cup \{T \sqsubseteq ContentType\}$
9: $\alpha_r = \alpha_r\{contentType(e_i, T)\}$
10: end for
//Establish relation of $R_l$ to resources in $R$
11: for all $r \in R$ do
12: $\alpha_D$ = createAssertions($R_l, R, D$)
13: $\alpha_r = \alpha_r \cup \alpha_D$
14: end for

Process 3 Diversity Maximization Algorithm

Require: Set $K$, parameter $\lambda$, $N < |K|$, query resource $r_i$
Ensure: Subset $R \subseteq K$ that maximizes $f_i$ s.t. $|R| = N$
    Initialize set $R = \emptyset$; Indices matrix $I[|K|, N] = \emptyset$;
    for $w = 0$ to $N$ do
3:     $B[0, w] = -\infty$
    end for
    for $j = 1$ to $|K|$ do
6:     $B[j, 0] = 0$
    end for
    for j=1 to $|K|$ do
9:     for for w=0 to $N$ do
        $w_j = 1$
        if $(w_j <= w)$ then
12:         $R^* = 0$
        for index $d \in I[j - 1][w - w_j]$ do
            $R^* \leftarrow (R^* \cup r_d)$ s.t. $r_d \in K$
15:         end for
        $p_j = 1 - (1 - Rel(R^*|i))*(1 - P(rel|i, r_j))$
        $q_j = (1 - \lambda)p_j + \lambda Div(R^* \cup r_j)$ s.t. $r_j \in K$
18:         if $(q_j > B[j - 1][w])$ then
            *Increase the value which is to be maximized*
            $B[j][w] = q_j$;
21:             $I[j][w] \leftarrow I[j - 1][w - w_j] \cup j$
        else
            $B[j][w] = B[j - 1][w]$
24:             $I[j][w] = I[j - 1][w]$
        end if
        else
27:         $B[j][w] = B[j - 1][w]$
        $I[j][w] = I[j - 1][w]$
        end if
30:     end for
    end for
    for $d \in I[|K|][N]$ do
33:     $R \leftarrow (R \cup r_d)$ s.t. $r_d \in K$
    end for

GENERATING USER RECOMMENDATIONS

BACKGROUND

1. Field

The present disclosure relates generally to recommendation systems.

2. Information

Existing recommender systems generally are specific to a subject matter area, such as for hotels, flights and/or books. Greater flexibility and/or a variety of other potential improvements without a significant degradation in quality of recommendation may therefore be desirable.

BRIEF DESCRIPTION OF DRAWINGS

Claimed subject matter is particularly pointed and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

FIG. 6 is a table providing example pseudo code for an embodiment;

FIG. 7 is a table providing example pseudo code for another embodiment; and

FIG. 8 is a table providing example pseudo code for still another embodiment.

Figure 1:
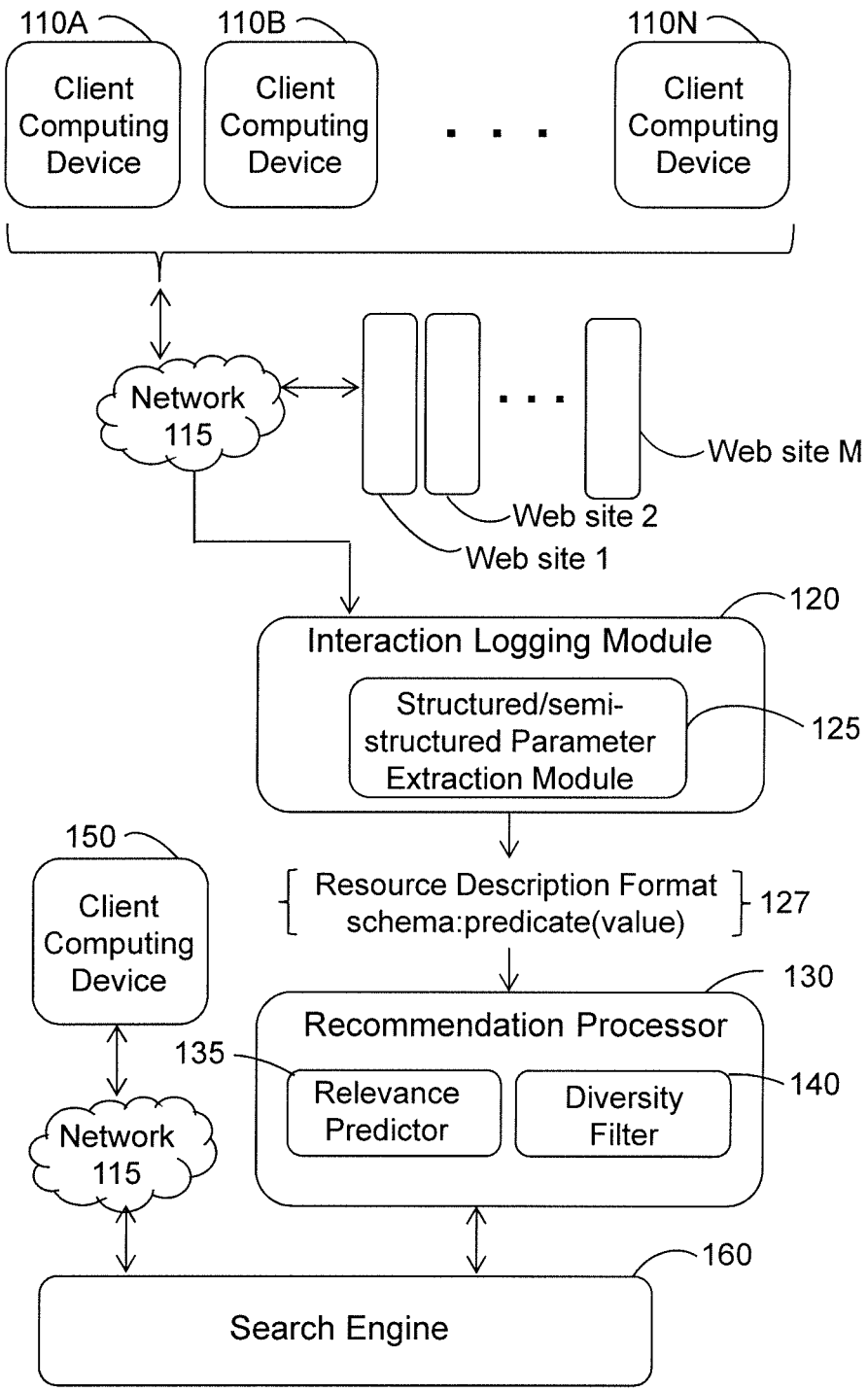
FIG. 1 is a schematic diagram of a network according to an embodiment.

Reference is made in the following detailed description of the accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which apportions of a computational problem may be allocated among computing devices, including one or more clients and one or more servers, via a computing and/or communications network, for example.

In this context, a Map-Reduce type architecture refers to implementation for processing and/or generating large sets of signal samples with a parallel, distributed process over a network of individual computing devices. A map operation performs processing to generate a key-value pair and distributes those pairs to servers and a reduce operation performs a summary operation (such as counting the number of students in each queue, yielding name frequencies). A system may employ such an architecture for processing by marshalling distributed servers, running various tasks in parallel, managing communications and signal transfers between various parts of the system, in an embodiment. One non-limiting but well-known example is the Hadoop distributed computing system, which refers to an open source implementation of a map-reduce type architecture. A Hadoop distributed operating system may include other aspects, such as the Hadoop distributed file system (HDFS). In general, Hadoop refers to an implementation scheduler for executing large processing jobs using a map-reduce architecture.

A network may comprise two or more network devices and/or may couple network devices so that signal communications, such as in the form of signal packets and/or frames, for example, may be exchanged, such as between a server and a client device and/or other types of devices, including between wireless devices coupled via a wireless network, for example.

In this context, the term "network device" refers to any device capable of communicating via and/or as part of a network and may comprise a computing device. While network devices may be capable of sending and/or receiving signals (e.g., signal packets and/or frames), such as via a wired and/or wireless network, network devices may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B, or C, is intended to mean A, B, and C, here used in the inclusive sense, as well as A, B, or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computer and/or machine readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be compliant and/or compatible with differing protocols, such as computing and/or communication protocols (e.g., network protocols), may interoperate within a larger network. In this context, the term sub-network refers to a portion and/or part of a network. Sub-networks may also comprise links, such as physical links, connecting and/or coupling nodes to transmit signal packets and/or frames between devices of particular nodes including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting network communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate noes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but such devices outside the private network may not necessarily direct inbound network communications to devices included in the private network.

The Internet refers to a decentralized global network of interoperable networks that comply with the Internet Protocol (IP). It is noted that there are several versions of the Internet Protocol. Here, the term Internet Protocol or IP is intended to refer to any version, now known and/or later developed. The Internet includes local area networks (LANs), wide area networks (WANs), wireless networks, and/or long haul public networks that, for example, may allow signal packets and/or frames to be communicated between LANs. The term world wide web (WWW or web) and/or similar terms may also be used, although it refers to a sub-portion of the Internet that complies with the Hypertext Transfer Protocol or HTTP. For example, network devices may engage in an HTTP session through an exchange of Internet signal packets and/or frames. It is noted that there are several versions of the Hypertext Transfer Protocol. Here, the term Hypertext Transfer Protocol or HTTP is intended to refer to any version, now known and/or later developed. It is likewise noted that in various places in this document substitution of the term Internet with the term World Wide Web may be made without a significant departure in meaning and may, therefore, not be inappropriate in that the statement would remain correct with such a substitution.

Although claimed subject matter is not in particular limited in scope to the Internet or to the web, it may without limitation provide a useful example of an embodiment for purposes of illustration. As indicated, the Internet may comprise a worldwide system of interoperable networks, including devices within those networks. The Internet has evolved to a public, self-sustaining facility that may be accessible to tens of millions of people or more worldwide. Also, in an embodiment, and as mentioned above, the terms "WWW" and/or "web" refer to a sub-portion of the Internet that complies with the Hypertext Transfer Protocol or HTTP. The web, therefore, in this context, may comprise an Internet service that organizes stored content, such as, for example, text, images, video, etc., through the use of hypermedia, for example. A HyperText Markup Language ("HTML"), for example, may be utilized to specify content and/or format of hypermedia type content, such as in the form of a file or an "electronic document," such as a web page, for example. An Extensible Markup Language ("XML") may also be utilized to specify content and/or format of hypermedia type content, such as in the form of a file or an "electronic document," such as a web page, in an embodiment. Of course, HTML and XML are merely example languages provided as illustrations and, furthermore, HTML and/or XML is intended to refer to any version, now known and/or later developed. Likewise, claimed subject matter is not intended to be limited to examples provided as illustrations, of course.

The term "web site" and/or similar terms refer to a collection of related web pages, in an embodiment. The term "web page" and/or similar terms refer to any electronic file and/or electronic document, such as may be accessible via a network, by specifying a uniform resource locator (URL) for accessibility via the web, in an example embodiment. As alluded to above, a web page may comprise content coded using one or more languages, such as, for example, HTML and/or XML, in one or more embodiments. Although claimed subject matter is not limited in scope in this respect. Also, in one or more embodiments, developers may write code in the form of JavaScript, for example, to provide content to populate one or more templates, such as for an application. Here, JavaScript is intended to refer to any now known or future versions. However, JavaScript is merely an example programming language. As was mentioned, claimed subject matter is not limited to examples or illustrations.

Terms including "entry," "electronic entry," "document," "electronic document," "content," "digital content," "item," and/or similar terms are meant to refer to signals and/or states in a format, such as a digital format, that is perceivable by a user, such as if displayed and/or otherwise played by a device, such as a digital device, including, for example, a computing device. In an embodiment, "content" may comprise one or more signals and/or states to represent physical measurements, for example. For one or more embodiments, an electronic document may comprise a web page coded in a markup language, such as, for example, HTML (hypertext markup language). In another embodiment, an electronic document may comprise a portion and/or a region of a web page. However, claimed subject matter is not limited in these respects. Also, for one or more embodiments, an electronic document and/or electronic entry may comprise a number of components. Components in one or more embodiments may comprise text, for example, as may be displayed on a web page. Also for one or more embodiments, components may comprise a graphical object, such as, for example, an image, such as a digital image, and/or sub-objects, such as attributes thereof. In an embodiment, digital content may comprise, for example, digital images, digital audio, digital video, and/or other types of electronic documents. Thus, again, as used herein, "electronically stored document," and/or similar terms (such as may be returned from a search engine, including as a hyperlink, for example, as a response to submittal of a search query) refers to any type of human- and/or device-readable content in the form of electronic signals and/or physical states, such as memory states. For example, a human readable electronic document may comprise content, such as magazine, journal, and/or newspaper articles, accessible from storage, such as online and/or network storage, including a local network, for example. As one non-limiting example, written content may be stored using and/or as a Portable Document Format (PDF), just to name an example. An electronic document, such as one with text, may likewise comprise one or more portions of an audio file; one or more portions of a video file, such as a still image, a video "clip," and so forth. An electronic document may also comprise stored device-readable materials, such as UPC codes, QR codes, and/or other materials comprising symbols that may not be easily understood by a human. It should be noted that claimed subject matter is intended to embrace all types of electronic documents, which may be represented using arrangements of binary digital signals (e.g., signal samples) capable of storage using transformations of physical states, such as memory states, for example.

Signal packets and/or frames, also referred to as signal packet transmissions and/or signal frame transmissions, and may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet and/or frame may, for example, be communicated via a communication channel and/or a communication path comprising a portion of the Internet, from a site via an access node coupled to the Internet. Likewise, a signal packet and/or frame may be forwarded via network nodes to a target site coupled to a local network, for example. A signal packet and/or frame communicated via the Internet, for example, may be routed via a path comprising one or more gateways, servers, etc. that may, for example, route a signal packet and/or frame in accordance with a target and/or destination address and availability of a network path of network nodes to the target and/or destination address. Although the Internet comprises a network of interoperable networks, not all of those interoperable networks are necessarily available and/or accessible to the public.

In particular implementations, a network protocol for communicating between devices may be characterized, at least in part, substantially in accordance with a layered description, such as the so-called Open Systems Interconnection (OSI) seven-layer model. Although physically connecting a network via a hardware bridge is done, a hardware bridge may not, by itself, typically include a capability of interoperability via higher level layers of a network protocol. A network protocol refers to a set of signaling conventions for computing and/or communications between and/or among devices in a network, typically network devices; for example, devices that substantially comply with the protocol and/or that are substantially compatible with the protocol. In this context, the term "between" and/or similar terms are understood to include "among" if appropriate for the particular usage. Likewise, in this context, the terms "compatible with", "comply with" and/or similar terms are understood to include substantial compliance and/or substantial compatibility.

Typically, a network protocol, such as protocols characterized substantially in accordance with the aforementioned OSI model, has several layers. These layers may be referred to here as a network stack. Various types of network transmissions may occur across various layers. A lowest level layer in a network stack, such as the so-called physical layer, may characterize how symbols (e.g., bits and/or bytes) are transmitted as one or more signals over a physical medium (e.g., twisted pair copper wire, coaxial cable, fiber optic cable, wireless air interface, combinations thereof, etc.). Progressing to higher-level layers in a network protocol stack, additional operations may be available by initiating network transmissions that are compatible and/or compliant with a particular network protocol at these higher-level layers. Therefore, for example, a hardware bridge, by itself, may be unable to forward signal packets to a destination device since transmission of signal packets characterized at a higher-layer of a network stack may not be supported by a hardware bridge. Although higher-level layers of a network protocol may, for example, affect device permissions, user permissions, etc., a hardware bridge, for example, may typically provide little user control, such as for higher-level layer operations.

A virtual private network (VPN) may enable a remote device to more securely (e.g., more privately) communicate via a local network. A router may allow network communications in the form of network transmissions (e.g., signal packets and/or frames), for example, to occur from a remote device to a VPN server on a local network. A remote device may be authenticated and a VPN server, for example, may create a special route between a local network and the remote device through an intervening router. However, a route may be generated and/or also regenerate if the remote device is power cycled, for example. Also, a VPN typically may affect a single remote device, for example, in some situations. A network may be very large, such as comprising thousands of nodes, millions of nodes, billions of nodes, or more, as examples.

Media networks, such as the Yahoo!™ network, for example, may be increasingly seeking ways to attract users to their networks and/or to retain users within their networks for extended periods of time. A media network may, for example, comprise an Internet Web site and/or group of Web sites having one or more sections. For instance, the Yahoo!™ network includes Web sites located within different categorized sections, such as sports, finance, current events, and games, to name just a few non-limiting examples among a variety of possible examples. To attract and/or retain users within its network, Yahoo!™ and/or other media networks may continually strive to provide content relating to categorized sections that may be interesting and/or of use to users.

As more users remain within a media network for extended periods of time, a media network may become more valuable to potential advertisers. Thus, typically, advertisers may be inclined to pay more money and/or provide other considerations to a media network in return for advertising to users, for example, via that media network, its partners, and/or subsidiaries. In an implementation, if a user displays a page, perhaps as a result of utilizing a search engine, such as via a server, as an example, located within or external to a processing and/or communications infrastructure of a media network, the server may deliver relevant content, which may include, for example, textual and/or multimedia content that may entice users to remain within the media network for a relatively extended period of time.

As a non-limiting example, responsive to submitting a search query (e.g., terms that may be submitted to a search engine) for example, and/or as a result of any other type of interaction with a client computing platform, for example, such as via a browser, a user may access one or more pages (e.g., web pages), for example. Search query results and/or query suggestions that may be beneficial to a user in conducting further search operations may be delivered to a client computing device, such as for presentation to a user, by way of a display device coupled to a client computing device. Search results and/or search query suggestions, for example, may be arranged, at least in some instances, in decreasing order of relevance, such as may be determined and/or estimated by search query processing operations. Presentation of search results, such as in decreasing order of relevance (e.g., more relevant search results displayed near a top portion of a search results page), as a non-limiting example, may permit a user of a client computing device to more efficiently access one or more electronically stored documents, for example, that may be reasonably pertinent to a submitted search query.

In some embodiments, a large corpus of content, such as electronic documents, which may number in the hundreds of millions, billions, or may be virtually without limitation, may be stored across a vast network of devices, including memory devices capable of being accessed by computing and/or network devices, for example. In such a network, which may be referred to as a "distributed system" (e.g., a Hadoop distributed computing system), a processing node may represent a single device or a cluster of computing, network and/or storage devices, although claimed subject matter is not limited in scope in this respect. Processing nodes may be organized into processing clusters and/or processing groups comprising any number of individual devices, such as a single computing and/or networking device, a collection of several computing and/or network devices, or perhaps many hundreds, thousands, or greater number of individual computing and/or network devices. Claimed subject matter is intended to embrace the vast variety of possible distributed computing and/or network arrangements.

Also as used herein, the term "parameter" and/or similar terms, such as "structured parameters" and/or "semi-structured parameters," for example, refers to signal samples descriptive of a collection of other signal samples, including specifying and/or otherwise describing signal sample format, such as for one or more electronic documents, as an example. Furthermore, parameters themselves exist in the form of physical signals and/or states, such as memory states and/or electronic transmission signals. For example, one or more parameters, such as referring to parameters with respect to an electronic document comprising a Web site, may comprise an embedded markup language, such as a version of HTML and/or CSS, for example (e.g., any version now known and/or to be developed later). As a further non-limiting example, a photographic image may include parameters, such as time of day at which a photographic image was taken, latitude and longitude of an image capture device, such as a camera, for example, etc. In another example, one or more parameters relevant to content comprising a technical article may include one or more authors, for example. Claimed subject matter is intended to embrace meaningful, descriptive parameters in the form of physical signals and/or states, which may include, as parameter examples, name of the an electronic document (e.g., file identifier), purpose of an electronic document, time and date of creation of an electronic document, logical path of an electronic document (or portion thereof), encoding formats and/or standards used for encoding an electronic document, and so forth.

In one or more embodiments, responsive to receipt of a query from a client device, for example, a service may be utilized to provide logical paths for parameters, such as a universal resource locator (URL), as an example, which may enable a client device to access content, such as electronic documents, for example, and/or portions thereof. A path for a parameter, such as a logical path, may refer to a logical path for a component of a specific network resource of a host computing device and/or host storage device at which electronic documents, for example, may be stored and/or otherwise made accessible, such as stored in particular memory locations, for example. For an embodiment, parameters for content, also referred to as content related parameters, may be made accessible, along with providing other additional services.

Existing recommender systems generally are specific as to a subject matter area, such as for hotels, flights and/or books. Greater flexibility and/or a variety of other potential improvements without a significant degradation in quality of recommendation may therefore be desirable. Embodiments of claimed subject matter may comprise a recommender system, for example. In this context, the term 'recommender,' 'recommender system,' and/or similar terms refer to a system, device, etc., (which may include stored executable software instructions, for example) capable of making user recommendations with respect to content potentially of interest to a user based at least in part on express and/or inferred user preferences. Thus, for example, an illustrative embodiment may exploit one or more of the following: (1) parameters, including structured and/or semi-structured parameters, such as may be extracted from webpages; (2) user interaction logs, such as may be stored on one or more servers; and/or (3) an ontology, described in more detail below. Nonetheless, in this context, an ontology and/or similar terms refer to a commonly understood vocabulary with respect to resources and relationships between and/or among them. For example, an embodiment recommender system may include as capabilities one or more of the following: (a) making recommendations across Web sites (e.g., across Web site domains); (b) making recommendations across different types of resources (e.g., across resource types, such as different types of products in a product catalogue); (c) making user recommendations without explicit user ratings for training; and/or (d) making recommendations without human intervention, such as without human editorial involvement. Thus, in this context, the term cross-domain and/or similar terms refer to a recommendation that comprises either a different resource type or a different Web site.

Figure 4:
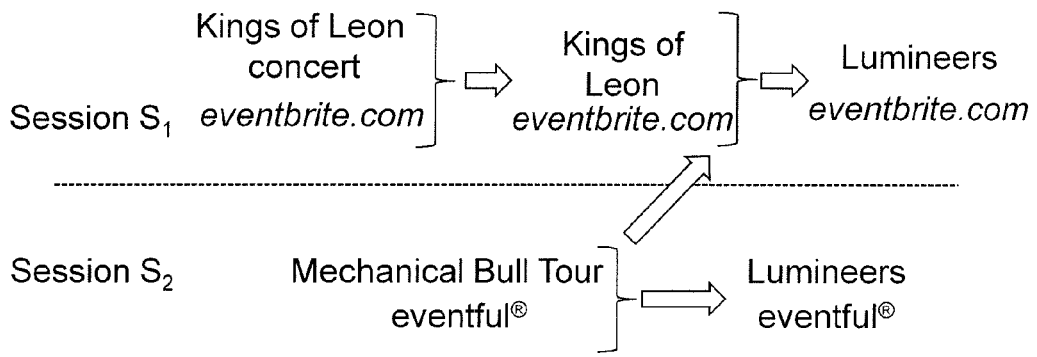
FIG. 4 is a schematic diagram illustrating an example of user browsing sessions.

For example, FIG. 4 illustrates an instance in which an embodiment 400 of a recommender system in accordance with claimed subject matter may be practiced. In general, if a user is engaged in a browsing session, one approach may be to recommend to a user a list of N electronic documents (e.g., Web sites and/or Web pages) accessible via browsing the user might visit next. As has been discussed, it may be desirable to be able to suggest resources of different types from across the Web, for example. In FIG. 4, a user has initiated a web browsing session, such as session $S_1$, and accessed a page that concerns the Kings of Leon concert (type=concert) in Columbus, Ohio, as the Web site Eventbrite (e.g., www.eventbrite.com). Subsequently, the user visited pages about the performer Kings of Leon (type=performer) and about the performer Lumineers (type=performer). In a separate browsing session, $S_2$, another user visits a page that concerns the Mechanical Bull Tour at the site Eventful (e.g., www.eventful.com). In the example of FIG. 4, the concert event (type=event) indicated at www.eventful.com comprises the identical concert event as the event identified at www.eventbrite.com, although of a different type than "concert" and located at a different site. This is to say that, in at least one nonlimiting example, a relationship may be established among the visited Web pages even though the visited pages pertain to the types: "concert," "event," and "performer."

In particular embodiments, as the example above suggests, recommendations to users (e.g. users of client devices) may be generated in response to implicit ratings that may be inferred by way of evaluation of interaction logs aggregated from a collection of users (e.g., user client devices). However, claimed subject matter is not limited in this respect. For example, in some embodiments, express user preferences (e.g., a user's explicit rating of a particular venue at tripadvisor.com) may be employed alternately or in addition to employing an inferred approach.

Figure 5:
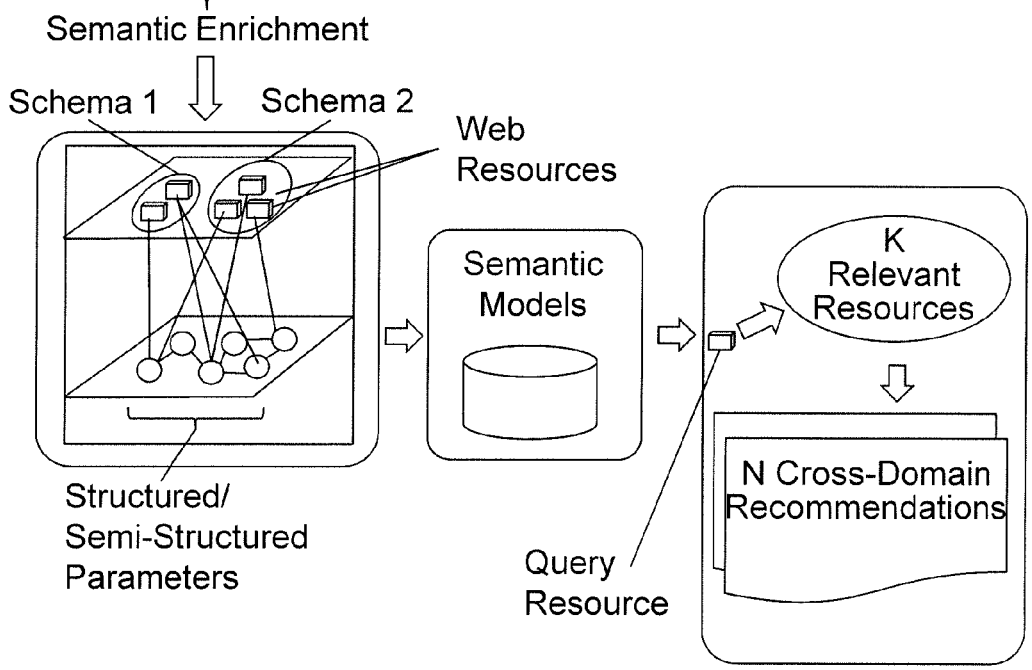
FIG. 5 is a schematic diagram illustrating an example embodiment.

FIG. 5 illustrates a schematic diagram of a possible embodiment 500 for a cross-domain recommendation approach. Sessions of user browsing logs comprise events in which a user has visited a resource at a given time in the form of interaction logs (e.g., uk9F@d_01, . . . , US in FIG. 5). Visited resources may be linked to an ontology, such as Schema 1, Schema 2, in FIG. 5, to form structured and/or semi-structured parameters, which may be mapped to a common ontology. Semantic models, also known as schemas or ontologies, may be used to combine extracted structured and semi-structured parameters with an interaction log. Based, at least in part, on semantic models, a set of K resources relevant for a user to visit next may be predicted. Likewise, diversity enhancement may be employed for an embodiment on the set K to generate a list of N recommendations from diverse domains.

In the context of claimed subject matter, an "interaction log" may comprise, for example, one or more logs, stored electronically, of a user's browsing activities (e.g., web browsing). Accordingly, in one possible example, an interaction log may comprise a list of Web sites visited by a particular user, for example. It should be noted that in an embodiment, interaction logs may also provide insights into additional user behaviors beyond relevance of content, such as contextual knowledge, as explained in more detail hereinafter.

In an embodiment 600, a Web Browsing Activity Model (WAM), with respect to browsing sessions, may be employed to form a semantic model combining structured and semi-structured parameters with browsing sessions, as illustrated by pseudo-code in FIG. 6. A WAM may accord with, for example, a WAM described in the article by Julia Hoxha and Sudhir Agarwal, titled *Semantic Formalization of Cross-site User Browsing Behavior* (IEEE/WIC/ACM International Conferences Web Intelligence and Intelligent Agent Technology, 978-0-7695-4880-7/12). A string-based representation of ordered browsing events in a session may be processed to produce an "assertion" regarding the particular browsing activity. In at least one embodiment, if a considerable number of interaction logs are evaluated, inferences may be drawn, such as to relevance, as described below. In addition, by obtaining interaction logs facilitated by, for example, one or more toolbars installed in a web browser, for example, browsing habits across a wide variety of Web domains and/or Web properties may be collected. Consequently, a recommendation system in accordance with claimed subject matter may generate recommendations based, at least in part, on user behaviors, such as logged interactions, across a number of Web domains and/or Web properties for an embodiment.

For example, contextualized knowledge may potentially be obtained using such an approach and/or similar approaches. That is, in an embodiment, associating content browsed by a user with structured and/or semi-structured parameters in an electronic document, such as a Web site, may provide semantic insight and/or semantic enrichment as to a particular browsing event. If semantic insights and/or enrichment are capable of being captured in a systematic way, for example, it may aid in providing improved recommender systems.

As an example, interaction logs may be evaluated to determine Web sites, for example, visited by one or more users in a particular embodiment. In a particular embodiment, a "relevant resource" may comprise an electronic and/or an electronically generated document, such as a webpage, which may be relevant to a user. Thus, a relevant resource, (e.g., resource herein) may be derived (e.g., by parsing) from browsing interaction logs, for example. Accordingly, in one possible example, a user may engage in Web browsing, which results in visitation of relevant resources. In an embodiment, therefore, relevant resources may be inferred based, at least in part, on an evaluation of a frequency at which "resources," such as webpages and/or other types of electronic documents, are visited by one or more users, such as of a collection of users, for example.

In an embodiment, to estimate relevance of a resource, such as a Web document (e.g., electronic document accessible via the Web), structured and/or semi-structured parameters (e.g., embedded markup language(s), such as Resource Description Framework with Attributes (RDFa) or HTML5 Microdata for example), may, for example, be extracted. It is noted that in an embodiment, extraction may take place without human involvement, such as substantially in accordance with an illustration provided below as a non-limiting example.

At times, herein, a relevant resource may be indicated by way of shorthand notation, such as "$r_i$." In this context, it may also be desirable to link separate resources semantically. Doing so, for an embodiment, for example, may be of use in connection with developing a recommender system able to provide cross-domain recommendations to a user, for example. Linking resources via an ontology that may not be linked as a direct result of browsing by a particular user (since typically a given user may be unaware of a related relevant resource) may be referred to here as identifying a "semantic bridge."

In an embodiment, structured and/or semi-structured parameters may be extracted from relevant resources, such as webpages, visited by users, of a collection, for example. FIG. 7 illustrates pseudo-code of a process 700 for exploiting extracted parameters. Likewise, in an embodiment, instances of an ontology may be populated responsive to captured browsing behavior, such as by way of interaction logs. Furthermore, in an illustrative embodiment, a resource, "$r_i$," may be linked to another resource in an ontology. Linking (e.g., bridging) of relevant resources may in an illustrative embodiment be accomplished via an ontology, as described below. However, claimed subject matter is of course not limited in scope to examples and/or embodiments provided as illustrations.

In yet another illustrative embodiment, recommendations that may be relevant, but that may also comprise a more diversity set may, for example, also be desirable. It is contemplated that diversity, at least in some embodiments, may assist users in exploring topics (e.g., other relevant resources) that may have been previously unknown to the users and/or at least not immediately apparent. Thus, an illustrative embodiment is also discussed below.

FIG. 1 is a schematic diagram showing an embodiment 100 in which user recommendations may be generated. In FIG. 1, client computing devices 110A, 1108, and 110N may represent a collection of client computing devices (e.g., associated with corresponding users, for example), which may number into the thousands, hundreds of thousands, millions, and so forth, virtually without limitation. In some embodiments, client computing devices 110A through 110N may comprise one or more processors, memory arrays, memory controllers, user interfaces, and so forth, which may operate to permit one or more users to interact with and/or "browse" electronic documents, resources, such as Web resources, etc., which may be accessible using network 115, for example. In an embodiment, network 115 may represent the Internet, but may also represent other networks, such as a corporate intranet, for example. It is intended that a variety of networking and/or computing arrangements are encompassed. Claimed subject matter is not limited to a particular arrangement.

In an embodiment, such as shown in FIG. 1, a browser of client computing devices 110A through 110N may be instrumented with a toolbar, for example, as mentioned, that may permit logging of interactions, such as visited resources. Accordingly, interaction logs may comprise a list of resources, such as Web site 1, Web site 2, through Web site M, for example, along with one or more indications of time spent visiting one or more resources, for example. Over a particular time span, such as one day, one week, one month, and so forth, interaction logging, for example, may be implemented to log interactions of client computing devices 110A through 110N with Web site 1 through Web site M. Logging may comprise, for example, real-time monitoring of interactions, in which interaction logging may include receipt of reports of Web sites visited and/or other parameters, relatively soon after an electronic document, such as a Web page, is loaded to a client computing device, as an example. In other instances, logging may comprise, for example, batch reporting, in which interaction logging may comprise occasionally (e.g., hourly, daily, weekly, etc.) receipt of reports of Web sites visited by one or more of client computing devices 110A through 110N. Again, a variety of approaches are contemplated and claimed subject matter is not limited to these example illustrations.

Figure 2:
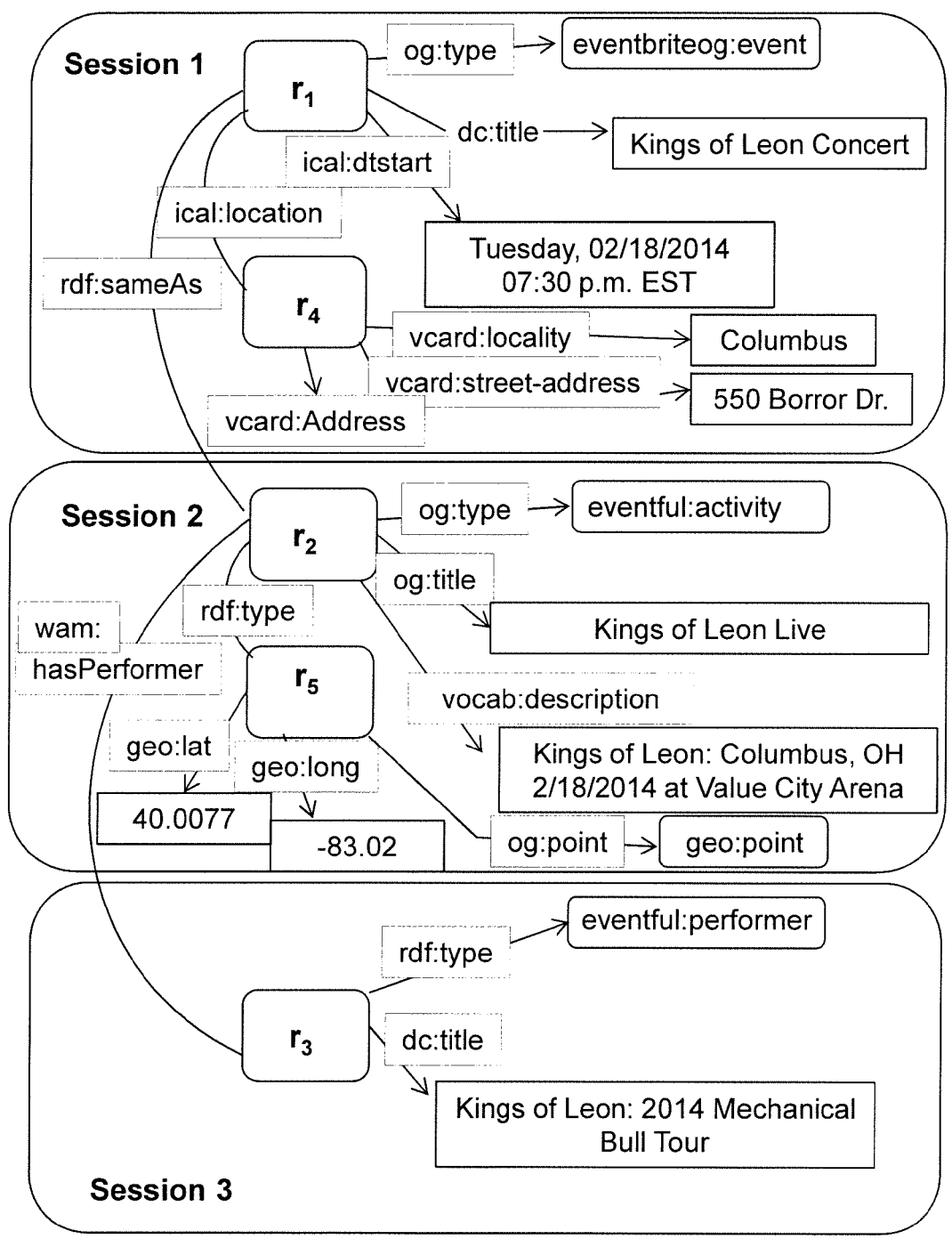
FIG. 2 is a schematic diagram showing extraction of structured and/or semi-structured parameters from Web sites visited during a browsing session according to an embodiment.

In an embodiment, such as shown in FIG. 5, and as discussed in greater detail with regard to FIG. 2, parameter extraction may take place responsive to receiving one or more universal resource indicators (URI) so as to extract individual content items (e.g., event names, venue names, show times, addresses, and/or a wide variety of additional parameters) from one or more resources, such as Web sites. Structured and/or semi-structured parameters may be extracted from the Web site and mapped to a known schema or ontology. For example, structured parameters and/or semi-structured parameters may be formatted in the form of triples, for example, which may comprise a subject, a predicate, and an object as, in the case of RDF, which refers to the Resource Description Framework. Such triples may express a single fact, e.g. a triple may assert that a resource is of type "Event," and another triple may assert that the title of the event is "Kings of Leon Concert." The type "Event" and the predicate "title" may be provided in an ontology or schema. As shown in FIG. 2, it may be common to visualize a collection of triples as a graph in which an edge between resources represents a triple. The triples may use a well-known ontology, such as schema.org, Facebook's "Open Graph" Protocol, or may be manually or automatically mapped to such an ontology.

In one possible example, just to illustrate, a resource description of "og:title("Brantley Gilbert")" may indicate use of a particular ontology, in which the prefix "og:" indicates Open Graph (e.g., an ontology). Likewise, parameters of a resource description may be extracted from an electronic document, such as a Web site. Within Open Graph, "title" corresponds to a predicate, and parenthetical value "Bradley Gilbert" corresponds to a title value. Thus, in an embodiment, extracted parameters, such as comprising resource descriptions, may be conveyed to a processor, such as 130, in the form of signals and/or states. Likewise, relevance prediction and/or diversification may be employed by a processor, for example, to generate recommendations in an embodiment, for example. Accordingly, user browsing activity may produce interaction logs, such as may be stored on server 160 to be processed. For example, server 160 may include a database.

FIG. 2 is an embodiment 200 of a system to extract structured and/or semi-structured parameters, such as from electronic documents, which may include Web sites visited during a browsing session, according to an embodiment. Thus, in an embodiment, extraction may take place without necessarily employing human interaction, such as human editorial services, for example. In an embodiment, such as FIG. 2, session 1, session 2, and session 3, as examples, may generate a parsed log of interactions, such as for interactions of one or more users associated with client computing devices 110A, 110B, and/or 110N, of FIG. 3. Browsing interaction sessions may occur sequentially, concurrently, and/or during non-contiguous, non-overlapping intervals. Of course, claimed subject matter is not limited to an illustrative example, such as the foregoing. In an embodiment, such as shown in FIG. 2, during session 1, a user may appear to have visited a Web site titled eventbrite.com, which may, for example, permit registering one or more events, such as to promote events, to sell tickets to events, and/or to provide a variety of other event-related services, for example.

Figure 3:
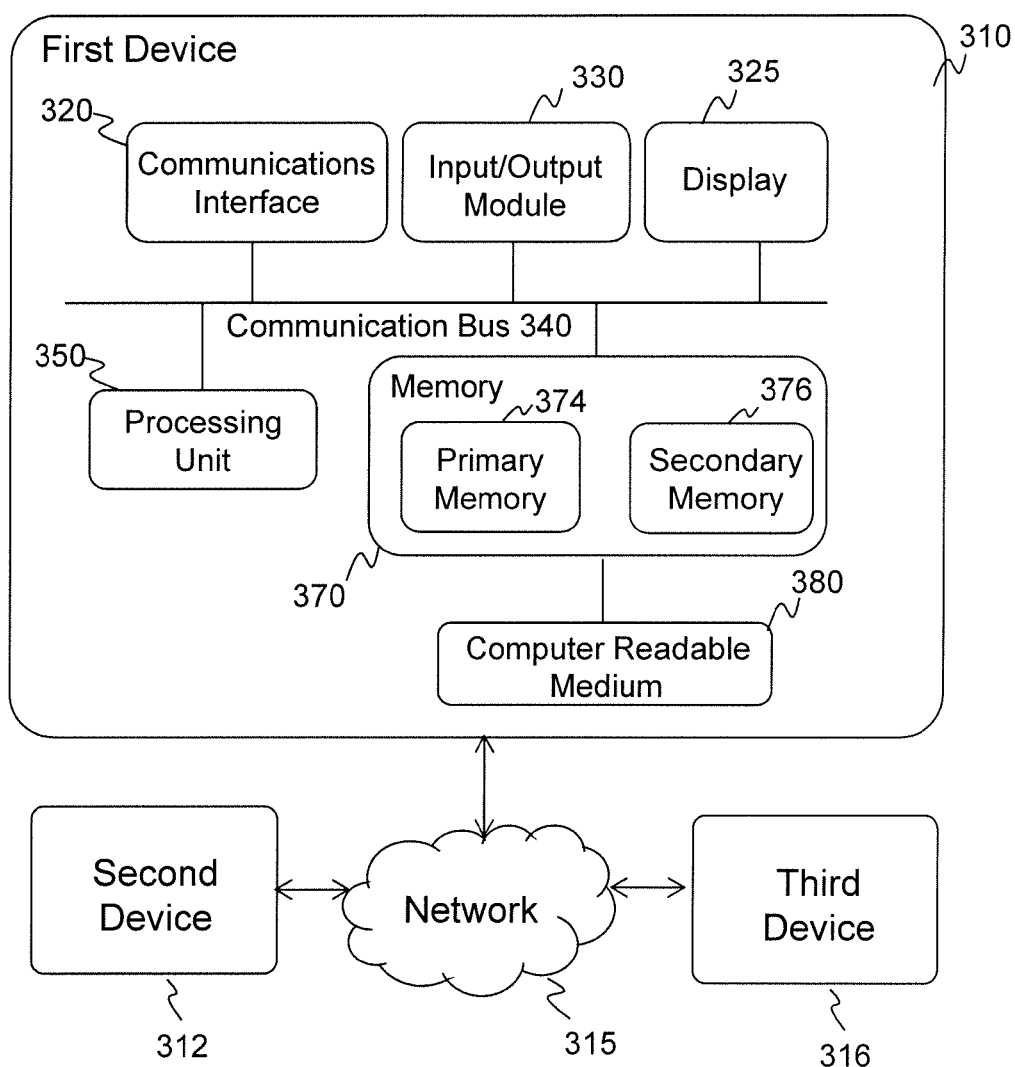
FIG. 3 is a schematic diagram of a computing platform according to an embodiment.

In the example of session 1, as shown in FIG. 2, parameter extraction may be employed with respect to HTML-encoded documents, for example, by utilizing a particular uniform resource indicator (URI), such as Web site 1 or Web site 2 of FIG. 3, for example, to retrieve structured and/or semi-structured parameters embedded in the HTML-encoded documents. In an embodiment, such as shown in FIG. 2, structured and/or semi-structured parameters may be evaluated within an ontology, such as Open Graph (e.g., og:), Dublin Core (e.g., dc:), iCalendar (e.g., ical:), vCalendar (e.g. vcal:), vCard (e.g., vcard:), XHTML (e.g., vocab:), and/or other frameworks, as examples. Again, claimed subject matter is not limited to an illustrative example.

In an embodiment, such as shown in FIG. 2, session 1 may comprise a browsing session in which interaction logging, for example, may indicate that a user visited a Web site ($r_1$) providing event-related parameters, such as www.eventbrite.com, followed by visiting a calendar application ($r_4$). Thus, resource $r_1$ may link to $r_4$, as an example. In one example, structured and/or semi-embedded parameters in the form of signal samples, for example, in a URI, may be extracted and formatted to correspond to a framework comprising a type predicate used in Open Graph (e.g., og:type). For example, an event may be registered at eventbrite.com (e.g., eventbriteog:event). Additional structured and/or semi-structured parameters extracted from $r_1$ in the form of signal samples may be formatted to correspond to a framework in which an event title utilizing a predicate of Dublin Core (e.g., dc:title) comprises signal samples, that may be stored and/or communicated, having a predicate value of "Kings of Leon Concert" and to a framework in which an example of iCalendar (e.g., ical:) utilizing a predicate "dtstart" comprises signal samples having a predicate value of "Tuesday, Feb. 18, 2014 07:30 p.m. EST." Thus, structured and/or semi-structured parameters embedded in a calendar application may comprise signal samples, appropriately formatted for a framework, for example, for a location in which signal samples for a locality predicate have a predicate value of "Columbus" (e.g., vcard:locality Columbus). Similarly, structured and/or semi-structured parameters may comprise signal samples embedded in a calendar application, such as associated with framework iCalendar, e.g. $r_4$ in this example, may also be formatted using a framework, such as vcard:street-address (e.g., 550 Borror Drive), and so forth, for example. Likewise, structured and/or semi-structured parameters may be extracted with respect to $r_2$, which may correspond to a URI, such as a Web site visited, for example, by a user during session 2. Accordingly, an identifier for an activity registered at eventful.com using Open Graph (e.g. og:type eventful:activity), for example, may be extracted along with a title (e.g., og:title Kings of Leon Live). In the example of FIG. 2, an XHTML-encoded description (e.g., vocab:description Kings of Leon: Columbus, Ohio Feb. 18, 2014 at Value City Arena) may also be extracted. It should be noted that numerous additional parameters may be extracted from resources $r_1$ and $r_4$, as a non-limiting example. For example, parameters available at $r_1$ may number into the hundreds, thousands, and so forth, virtually without limitation.

Likewise, parameter extraction may be employed with respect to interaction logs of browsing sessions 2 and/or 3, for example, to extract structured and/or semi-structured parameters embedded in one or more URIs. For example, in an embodiment, parameter extraction may recognize Open Graph. Thus, a predicate (e.g., og:type) may correspond to an activity registered at eventful.com (e.g. eventful:activity). Similarly, a title predicate may comprise signals samples having a predicate value of "Kings of Leon Live." Within session 2, resource r5 may map to a framework used for a geographical point, such as Open Graph, again (e.g., og:point). Signal samples extracted may comprise latitude and longitude predicates that may be formatted substantially in accordance with a World Geodetic Survey 1984 (e.g., WGS 84), such as geo:lat (e.g., 40.0077) and geo:long (e.g., −83.02), as another illustrative example. Likewise, in an embodiment, structured and/or semi-structured parameters corresponding to a predicate may comprise stored signal samples for an XHTML framework, for example, such as respective predicate and predicate value, such as vocab: description and "Kings of Leon:Columbus Ohio Feb. 18, 2014 at Value City Arena," respectively. As it pertains to session 3, resource $r_3$ may map to a framework (e.g., rdf:type) corresponding to an activity, registered@eventful.com (e.g., eventful:performer), in which signal samples again comprise a predicate and predicate value, respectively. Thus, in an embodiment, parameter extraction may likewise recognize a Dublin Core framework (e.g., dc:), such as for a title predicate comprising stored signal samples having a value corresponding to "Kings of Leon: 2014 Mechanical Bull Tour," in a format for signal samples, such as dc:title (e.g., Kings of Leon: 2014 Mechanical Bull Tour), for example. Thus, in an embodiment, extraction of structured and/or semi-structured parameters, for example, may be of use to identify semantic bridges for an ontology. An ontology in an embodiment may be of use in making cross-domain user recommendations, for example.

In an embodiment, parameter extraction may employ any technique with respect to, for example, sessions 1, 2, and/or 3 to evaluate, for example, whether separate resources $r_1$ and $r_2$, which appear to correspond, actually comprise a single event, such as a Kings of Leon concert in Columbus Ohio on Feb. 18, 2014 at Value City Arena, for an ontology, such as one using one or more resource description frameworks (e.g., rdf:sameAs), as shown in FIG. 2. In an embodiment, to evaluate whether separate resources $r_1$ and $r_2$ that may appear to correspond actually comprise a single event, parameter extraction may include performing entity resolution in an embodiment. Thus, respective resources, such as $r_1$, $r_2$, $r_3$, $r_4$, and $r_5$, may be compared (e.g., after extraction). Parameter extraction may, of course, likewise include additional operations.

In an embodiment, a comparison among respective sources may comprise measurement of string distances between extracted parameters, such as titles, descriptions, addresses, and so forth, which, again, comprise physical signal sample values, such as may be stored in memory, for example, and/or transmitted via a computing and communications network. In an embodiment, comparisons may employ measurement of a Levenshtein distance, as simply one example, which may involve determining distance between words and/or phrases by computing a number of single-character edits (e.g., insertions, deletions, and/or substitutions, and so forth) for changing one word/phrase into another. Thus, for example, Levenshtein distance may be measured between signal samples having values, such as "Kings of Leon Concert," which may comprise an extracted parameter for resource $r_1$, and signal samples having values, such as "Kings of Leon Live," which may comprise an extracted parameter for resource $r_2$. Here, a distance of seven characters (e.g., substitute "Live" with "Conc" and add the three letters "ert" to form "concert") may be determined. Thus, for an embodiment, processing, such as just illustrated, may be employed to inform an ontology, for example. Likewise, as described later, an ontology may be employed in connection with generation of feature signal (e.g., signal sample) vectors.

In an embodiment, for example, a relatively small Levenshtein distance may indicate correspondence among predicate values of extracted parameters. Thus, for example, as shown in FIG. 2, measurements of a Levenshtein distance between $r_2$ and $r_3$ may give rise to a determination with respect to the two resources, for example. In an example, the resources, which appear to correspond may, for example, be determined to comprise a single event. If so, resources $r_2$ and $r_3$, for example, may be related in an ontology, and/or may be related responsive to semantic enrichment of extracted parameters such as, for example, wam:hasPerformer, which may be based at least in part on WAM, for example, in an embodiment.

In general, Web browsing activities, via WAM, for example, in an embodiment, may be employed to describe logged interactions, such as wam:Event, as an example. Additional examples may include wam:ContentType, which may be employed to indicate a type of content for a resource accessed during a browsing event, and/or wam:Session, which may be employed to indicate a grouping of events within wam:StartEvent and wam:EndEvent, in an embodiment. Of course, claimed subject matter is not limited in scope to employing WAM. Rather, while an illustrative embodiment has been described; nonetheless, a variety of approaches are possible and are intended to be within claimed subject matter.

In the example of FIG. 2, resources $r_2$ and $r_3$ may be inferred as comprising a single corresponding event based, at least in part, on resource $r_3$ comprising signal samples having values for a type eventful:performer, in which may be found indications relating to resource $r_2$, for example. In an embodiment, relevance of a resource, such as $r_i$, which may correspond to one or more other resources, such as $r_1$, $r_2$, $r_3$, $r_4$, and $r_5$ of FIG. 2, for example, may be utilized to generate one or more user recommendations, for example, as described below for an illustrative embodiment.

In an embodiment, as an illustration, given two resources $r_i$ and $r_j$, a pair relevance, such as $P(\text{rel}|r_i,r_j)$, may comprise signal samples having values to capture relevance of resources $r_i$ and $r_j$ to one another. In an embodiment, a probabilistic interpretation may be utilized to approximate likelihood of $r_j$ satisfying a user intent given by resource $r_i$, for example. $P(\text{rel}|r_i,r_j)$ may be determined by a variety of approaches, including scoring based, at least in part, on user access patterns from interaction logs, such as, for sessions 1, 2, 3, and/or others, for example, as well as based at least in part on stored content for resources $r_i$, and $r_j$. In an embodiment, pair relevance, determined using $P(\text{rel}|r_i,r_j)$, may imply a symmetry suggesting, for example, that order with respect to a pair, e.g., $r_i$ and $r_j$, may be relatively unimportant, although other embodiments may employ alternate approaches.

Likewise, in an embodiment, signal samples may have values to be processed to capture set relevance substantially in accordance with the following:

$$\text{Rel}(K|r_i) = 1 - \Pi_{j \in K}(1 - P(\text{rel}|r_i,r_j)) \quad (1)$$

wherein expression 1 may be based, at least in part, on an independence assumption (e.g., given a resource $r_i$, conditional probabilities of two other resources satisfying a user's intent are treated as independent in expression 1). Thus, a probability that a user will find neither of the two resources $r_j$ and $r_k$ relevant may equal, or at least approximate $(1-P(\text{rel}|r_i,r_j))(1-P(\text{rel}|r_i,r_k))$ such that $(1-P(\text{rel}|r_i,r_j))$ is the probability that $r_j$ fails to satisfy a user intent given by $r_i$. The probability that the set K fails to satisfy a user intent may equal, or at least approximate, a product, specified above in expression 1, by way of, for example, the independence assumption. Thus, one minus the probability that the set K fails to satisfy a user intent equals, or least approximates, the probability that some resource in the set K satisfies user intent.

In an embodiment, machine learning techniques, such as support vector machines (SVM), for example, may be of use. In particular, machine learning may be employed to classify resources as relevant or not relevant. In a high-level sense, an appropriate task may be to learn a decision operation $f: R^d \rightarrow Y$ based, at least in part, on an independent and identically distributed training signal sample set, which may be given by $D_{train} = \{(x_1,y_2), (x_2,y_2), \ldots, (x_n,y_n)\}$, in which training signal samples may comprise feature signal (e.g., signal sample) vectors $x \in R^d$ and an output signal (e.g., signal sample) vector $y \in Y$ such that $Y = \{-1,1\}$, (e.g., not relevant; relevant). In an embodiment, a learned operation f may be used to predict an output signal sample having a value sign(f($x_k$)) for a test signal sample $x_k$. An initial set of parameters that may comprise an initial signal sample set may include a set X of resource pairs. In an embodiment, resource pairs may comprise signal samples having values in which x=⟨$r_i,r_j$⟩∈X which may be initially mapped to a d-dimensional feature signal vector x using, for example, an operation ψ:X→$R^d$. Output signal vector Y={−1,1} may indicate, for example, classes of non-relevant and relevant resources.

In an embodiment, relevance prediction may further comprise employing probability estimates. For example, P(rel|$r_i$, $r_j$) may be used. Thus, an estimate may be formulated to express confidence in the correctness of a prediction, for example. Accordingly, a class conditional posterior probability P(y/x)=P(y/ψ(x)) may be established, which may correspond to a probability with which a feature signal vector x of pair x=⟨$r_i,r_j$⟩ belongs to class y. Likewise, a support vector machine approach may be employed in which scores for an SVM approach may be computed using a sigmoid operation, substantially in accordance with $$P(rel \mid r_i, r_j)) = P(y=1 \mid \psi(x = \langle r_i, r_j \rangle)) = \frac{1}{1 + e^{(Af(x)+B)}} \quad (3)$$

using output signal vectors of f and estimating parameters A and B using training signal samples, as previously discussed.

In an embodiment, a set of K resources that are relevant to a resource $r_i$ may be predicted (e.g., have a pair relevance above approximately 0.0). Probability estimates may be derived by pairing, for example, $r_i$ with other resources. In an embodiment, machine learning, such as a support vector machine (SVM), may estimate relevance of P(rel|$r_i,r_j$) for one or more pairs, for example.

In an embodiment, a top-N recommendations may be selected from a set of K resources based at least in part on relevance to $r_i$, for example. In an embodiment, resources may have order according to predicted pair relevance, wherein, for example, results of higher estimated relevance may be listed first, followed by results of lower estimated relevance, as may be typical, although, of course, such an ordering is not required.

In an embodiment, as discussed, machine learning may be employed as an approach to generating probability estimates. For example, in an embodiment, feature signal (e.g., signal sample) vectors may be employed as a mechanism for generating estimates. Thus, a variety of feature signal vectors may be formulated. After being formulated, experiments may be conducted to assess feature signal vector performance. Thus, various feature signal vectors are discussed below; however, claimed subject matter is not limited to these illustrative examples. Rather, an embodiment may be substantially in accordance with and/or substantially consistent with previously described subject matter, but not necessarily employ particular illustrative feature signal vectors exactly as described below, for example.

In an embodiment, a semantic similarity feature may be employed in generating a feature signal vector. For example, a spreading approach may be employed with respect to structured and/or semi-structured parameters, such as may comprise examples of extracted resources, as previously described, for example. Thus, in an illustrative embodiment, weights may be used in conjunction with one or more structured and/or semi-structured parameters, such as may, for example, be extracted from webpages visited by users (e.g., based at least in part on a determination made from evaluating interaction logs, for an embodiment). In an embodiment, a weight, which may be indicated here by way of shorthand notation "$w_k$," wherein k corresponds to a particular resource, may indicate relevance of another resource, for example, with respect to the particular resource. Thus, for example, a resource description, {⟨$t_k,w_k$⟩} may represent a resource description, in which "t" represents a semantic "type" (e.g. performer, event, etc.) of a resource k denoted by a concept in the ontology O, and weight $w_k$ denotes an importance of the concept term in describing the resource. Accordingly, a relatively strong indication that a parameter (e.g., other resource) is relevant to a resource may give rise to a weight that may approach approximately 1.0, for example. Likewise, a relatively weak indication that a parameter (e.g., other resource) is relevant to a resource may give rise to a weight that may approach, for example, approximately 0.5, 0.25, 0.20, and so forth. Thus, in one possible example, if a parameter is linked to a name of a particular artist in an ontology, a higher weight (e.g., greater than approximately 0.95) may be employed for particular resources, such as webpages, that also comprise the name of the particular artist in a title field as a non-limiting example. In another example, two artists of a genre, such as country music, for example, may be linked in an ontology using a weight of, for example, approximately 0.75, approximately 0.5, or other signal samples of a value less than approximately 1.0, to indicate a weaker relationship. In general, weights comprise signal samples having a particular value. It should be noted, however, that claimed subject matter is not limited to a particular type of ontology or to use of particular weighting schemes for linking parameters, such as extracted parameters which may represent resources (e.g., and other related resources) in an ontology.

In an implementation, parameter linking may be based at least partially on an ontology, for example. In an embodiment, generating a semantic similarity feature may begin with an initial set of resources, such as $RD_k$={⟨$t_k,w_k$⟩}, in which for some embodiments, for example, t indicates a semantic type, such as performer, event, venue, and so forth, of a resource k from an ontology. As was indicated, a weight $w_k$ may comprise, for example, importance to a resource. For example, a title may comprise high importance in describing the resource "Concert in Columbus, July 4." In another example, a Web site for "Columbus Ohio Events" may also comprise high importance in describing the resource "Concert in Columbus, July 4." Linking via "spreading" may be iteratively extended or "spread" utilizing relation predicates in an ontology.

In embodiments, for example, a spreading set with respect to a resource set $RD_k$ may also comprise extended resources $RD'_k$={⟨$t_k,w_k$⟩,⟨$t_{k\_p}$,f_p($w_k$)⟩}. An initial set of resources may be spread or extended by a semantic type, such as $t_{k\_p}$, which may be related to $t_k$ in an ontology by a predicate p. In a particular embodiment, for example, an initially specified set of predicates may be utilized to find, at one or more iterations, for example, related resources.

In one example, an operation f_p($w_k$) may be set equal to, for example, 0.75 $w_k$ to estimate weight reduction at an iteration, for example, although claimed subject matter is not limited to use of any particular numerical factor such as 0.70 $w_k$, 0.65 $w_k$, 0.5 $w_k$, and so forth. In an embodiment, a spreading process may be terminated by exhausting an existing set of predicates with respect to a set of resources. A similarity of two resources (e.g., which may include extended resources) may then be estimated using, for example, mean cosine similarity of respective $RD_i$, for example.

In one possible example, just for the sake of illustration, consider the following two resources, $RD_1$ and $RD_2$, using an initial and/or default weight of 1.0 and using a type ($t_k$) "performer" in an ontology:

$$RD_1 = \{\langle \text{BrantleyGilbert}, 1.0 \rangle\}$$

$$RD_2 = \{\langle \text{ChelyWright}, 1.0 \rangle\}$$

An initial intersection check between $RD_1$ and $RD_2$ may indicate an empty set, since $RD_1$ and $RD_2$ may not have previously been semantically bridged in an ontology, for this example. Extending or "spreading" a resource may occur, in one embodiment, for example, by referring to a type ($t_{k\_p}$) "relation" to extend a resource as follows, for example:

$$RD'_1 = \{\langle \text{BrantleyGilbert}, 1.0 \rangle, \langle \text{CountrySinger}, 0.75 \rangle\}$$

$$RD'_2 = \{\langle \text{ChelyWright}, 1.0 \rangle, \langle \text{CountrySinger}, 0.75 \rangle\}$$

A second intersection check between extended or spread resources $RD'_1$ and $RD'_2$ may yield a non-empty set, indicating relatedness between resources. Accordingly, responsive to spreading of resources, such as, for example, inclusion of a related term "CountrySinger" indicates a relationship that exists between resources (e.g., including extended resources) that may be employed as part of a semantic similarity feature computation, for example.

In another embodiment, a signal sample having binary value may be utilized to indicate that a pair of resources ($r_i, r_j$) may share a corresponding type in an ontology. Likewise, in still another embodiment, a signal sample having a binary value may also be utilized to indicate that a pair of resources ($r_i, r_j$) may share a relation in an ontology. For example, resource $r_i$ may indicate an event type in an ontology and $r_j$ may indicate a venue type. In such an instance, resources ($r_i, r_j$) may share a relation "hasVenue," for example.

In an embodiment, a syntactic similarity feature may be used to indicate similarity among feature signal vectors comprising two resources computed, for example, as a cosine angle between two signal sample vectors comprising sets of constituent terms. In computing a cosine angle, grammar and word order, at least in particular embodiments, may be disregarded while term multiplicity may affect a computation, for example. In embodiments, syntactic similarity ($sim_{syntactic}$) may be computed substantially in accordance with:

$$sim_{syntactic}(r_i, r_j) = \frac{V(r_i) \cdot V(r_j)}{|V(r_i)| \cdot |V(r_j)|}$$

wherein V(i) comprises a real-value signal sample vector comprising weights of terms found in HTML encoded content of a resource $r_i$, such as, for example, as a result of parameter extraction, such as in accordance with FIG. 3, as a non-limiting example. Signal sample weights may be computed using a term frequency-inverse document frequency TF-IDF weighting scheme, for example. In embodiments, use of a term frequency-inverse document frequency weighting scheme permits computing $sim_{syntactic}$ of $r_i, r_j$ based, at least in part, on syntactic parameters.

In an embodiment, an Observed Relevance Degree feature may be used to capture observations from usage patterns in interaction logs, such as obtained from browsing sessions 1, 2, and/or 3 of FIG. 2, for example. In an embodiment, a heuristic mapping may be used with respect to correspondence between resource usage counts and user interest, such as, for example, between access patterns and a probability of relevance of a resource. An Expected Reciprocal Rank metric for aggregated browsing sessions may be computed substantially in accordance with expressions 4, 5, and 6 below:

$$ORD(r_i, r_j) = \frac{2^{g(i,j)}}{2^{g_{max}}} \quad (4)$$

$$g(r_j, r_j) = n \cdot \mathcal{F}(Freq(r_i, r_j)) \quad (5)$$

$$\mathcal{F}(Freq(r_i, r_j)) = \frac{|\{r_k \in S' | Freq_S(r_i, r_k) \le Freq_S(r_i, r_j)\}|}{|S'|} \quad (6)$$

In an embodiment, in expression 6, $S' \subseteq S$. Further, a signal sample having a value of $g(r_i, r_j)$ may indicate observed access frequencies for universal resource indicators (URIs) obtained from browsing sessions, such as session 1, 2, and/or 3 of FIG. 2, for example. In an embodiment, $g(r_i, r_j)$ may be normalized to a common rating scale, such as [0,n], based, least in part, on a cumulative distribution, such as $Freq(r_i, r_j)$ over a set comprising other universal resource indicators accessed in a session corresponding to a session in which $r_i$ and $r_j$ are accessed, for example. A estimate of relevance may comprise signal samples having a value of $g_{max}$ over, at least in particular embodiments, $g(r_i, r_j)$. Relevance may be computed using, for example, relevance prediction, such as previously described in connection with FIG. 1, for example. Of course, claimed subject matter is not limited in scope in this respect.

A conditional similarity feature may be specified as a conditional probability, for example, of a resource pair ($r_i, r_j$) occurring in a corresponding session in which resource $r_i$ appears, and may be computed substantially in accordance with expression 7:

$$sim_{conditional}(r_i, r_j) = \frac{Freq_S(r_i, r_j)}{Freq_S(r_i)} \quad (7)$$

A session similarity feature may be specified as a signal sample having a binary value such that if two resources in a pair, such as ($r_i, r_j$), appear together in at least one browsing session from a set, S, the feature may be computed substantially in accordance with expression 8, for example:

$$sim_{conditional}(r_i, r_j) = \begin{cases} 1, & \text{if } Freq_S(r_i, r_j) > 0 \\ 0, & \text{otherwise} \end{cases} \quad (8)$$

in which $Freq_S(r_i, r_j)$ comprises a count of sessions in which resources $r_i$ and $r_j$ occur together.

In an embodiment, diversification may also be implemented to make user recommendations. In a particular embodiment, a resource category may comprise a class or a category type to semantically annotate a resource, for example. Thus, a measure of diversity may be based, at least in part, on a semantic categorization of resources and/or a Web site at which a resource is located. In an embodiment, two resources in pair ($r_i, r_j$) may be considered "diverse" if, for example, any of the following conditions occurs: (1) resources in pair $(r_i,r_j)$ comprise different semantic types, and/or (2) resources in pair $(r_i,r_j)$ are located at different Web sites. Of course, claimed subject matter is not limited in scope to this approach to being "diverse." A variety of other approaches are possible. However, for such an approach, in an embodiment, a distance function may consider both aspects.

In a particular embodiment, to produce, for example, a list of recommendations R, given a set K of relevant resources for a resource $r_i$, distance between two resources $r_i,r_j \in K$ may be computed substantially in accordance with the following operation d: K×K→R, such that:

$$d(r_j,r_l;w_t)=w_t f_{type}(r_j,r_l)+(1-w_t)f_{site}(r_j,r_l)$$

such that $f_{type}(r_j,r_l) \in \{0,1\}, f_{site}(r_j,r_l) \in \{0,1\}$ (9)

in which an operation to measure distance may comprise, at least in some embodiments, a weighted average of signal samples having binary values produced by operations $f_{type}(r_j,r_l)$ and $f_{site}(r_j,r_l)$, for example, which may specify a type or a site, respectively, if the considered resources correspond. A weight $w_t$ may indicate a relevance of type which in particular implementations may be capable of being adjusted.

A diversity operation of a set of resources may be computed using, for example, average dissimilarity of pairs of resources in a set. In an embodiment, an average distance metric, for example, may be used substantially in accordance with expression 10, for example:

$$Div(R) = \frac{1}{|R|(|R|-1)} \sum_{r_j \in R} \sum_{r_l \in R, r_j \neq r_l} d(r_j, r_l) \quad (10)$$

wherein $d(r_j,r_l)$ corresponds to distance operation $d(r_j,r_l;w_t)$ of expression 9.

In an embodiment, for example, diversity may potentially be enhanced by generating an initial set of recommendations substantially in accordance with relevance, such as described, as an example, such as a similarity-type approach substantially in accordance with expressions 7 and 8. However, as might be expected, selected recommendations may be reasonably likely to be similar to one another. Yet, if a set comprises more diverse resources, it may be more probable that a user may find, in a more diverse set of recommendations, a recommendation consistent with user intent. In an embodiment, diversity may, for example, potentially be enhanced by following a Maximal Marginal Relevance scheme to trade-off relevance and diversity. For example, a small decline in relevance may produce a correspondingly more significant increase in diversity in an embodiment.

In a Maximal Marginal Relevance Scheme, given a resource, $r_i$, a set K of resources that may be previously predicted as relevant to $r_i$, an integer N, and a fixed control parameter $\lambda \in [0,1]$, a set of resources $R \subseteq K$ with $|R|=N$ are sought to improve an objective, such as the following:

$$\mathcal{F}(R,N,\lambda) \triangleq (1-\lambda)\text{Rel}(R|r_i)+\lambda \text{Div}(R) \quad (11)$$

in which the objective in expression 11 comprises a weighted, linearly normalized, arithmetic mean of set relevance and set diversity. A control parameter $\lambda$ may be utilized to adjust degree of trade-off between relevance and diversity in this example implementation.

In an embodiment, a greedy method may search a resource subset to make a locally-more improved choice at one or more stages. In a particular embodiment, however, combinatorial approaches, in which permutations of subsets may be attempted manually may, at least in some embodiments, be computationally difficult, or perhaps infeasible. In contrast to manual approaches, at least in some embodiments, dynamic programming may be utilized in which a task may be formulated as a variation of a "knapsack problem" in which resources from a set K are packed into a metaphorical "knapsack" having a capacity given by N. Resources, such as $r_i$, for example, may comprise a fixed weight $w_i$ and a quality value $q_i$ that may be brought about from a trade-off given by expression 11, for example. An objective may be to enhance a quality value of resources packed into the knapsack, so to speak. Accordingly, given parameters $\lambda \in [0,1]$ and $N \in Z^+$, a formulation may be substantially in accordance with expression 12:

$$\text{maximize} \sum_{j=1}^{|K|} \mathcal{F}(K, N)x_j \quad (12)$$

$$\text{subject to} \sum_{j=1}^{|K|} w_j \cdot x_j = N$$

$$x_j \in \{0, 1\}, r_j \in K$$

In expression 12, constraints may be imposed, in which a given resource may be chosen only one time, and the packed items must fill the knapsack to its exact capacity N, for example. In dynamic programming, a recursion may be employed in which a substructure or sub-problem may be formulated.

In an embodiment, filling a metaphorical knapsack with N items, which may be chosen from a set K of items, a sub-problem may comprise computing B[j,w], which may represent, for example, a quality value to be placed in the metaphorical knapsack. A parameter w may, at least in some embodiments, indicate an exact weight for a subset $R_j$ of items, whereas a variable j may be used to iterate through values 0 to |K|. A quality value, for example, may be computed using trade-off operation ($\mathcal{F}$) of expression 11 above. In an embodiment, a recursive approach may be computed substantially in accordance with expression 13:

$$B[j, w] = \begin{cases} B[j-1, w] & \text{if } w_k > w \\ \max(B[j-1, w], B[j-1, w-w_j]+q_j) & \text{otherwise} \end{cases} \quad (13)$$

Expression 13 captures that an acceptable subset in this example comprises 1) a subset comprising a total weight w, or 2) a subset of $R_{j-1}$ comprising a total weight w−$w_j$ plus an item $r_j$ with a quality value $q_j$. FIG. 8 illustrates pseudo-code for an example of an embodiment 800 to execute dynamic programming.

For purposes of illustration, FIG. 3 is an illustration of an embodiment of a system 300 that may be employed in a client-server type interaction, such as described infra., such as a network device and/or a computing device, for example. As one example, FIG. 3 may illustrate a portion of a distributed computing system. In addition or as an alternative, FIG. 3 may illustrate an example for use in connection with rendering a GUI via a device, such as a client, for communication with a server, for example. In FIG. 1, computing device 310 ('first device' in figure) may interface with client 312 ('second device' in figure), which may comprise features of a client computing device, for example. Communications interface 320, processor (e.g., processing unit) 350, and memory 370, which may comprise primary memory 374 and secondary memory 376, may communicate by way of a communication bus, for example. In FIG. 1, client computing device 312 may represent one or more sources of analog, uncompressed digital, lossless compressed digital, and/or lossy compressed digital formats for content of various types, such as video, imaging, text, audio, etc. in the form physical states and/or signals, for example. Client computing device 312 may communicate with computing device 310 by way of a connection, such as an internet connection, via network 315, for example. Although computing device 310 of FIG. 1 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter to limited in scope to illustrative examples.

Processor or processing unit 350 may be representative of one or more circuits, such as digital circuits, to perform at least a portion of a computing procedure and/or process. By way of example, but not limitation, processing unit 350 may comprise one or more processors, such as controllers, microprocessors, microcontrollers, application specific integrated circuits, digital signal processors, programmable logic devices, field programmable gate arrays, the like, or any combination thereof. In implementations, processing unit 350 may perform signal processing to manipulate signals and/or states, to construct signals and/or states, etc., for example.

Memory 370 may be representative of any storage mechanism. Memory 370 may comprise, for example, primary memory 374 and secondary memory 376, additional memory circuits, mechanisms, or combinations thereof may be used. Memory 370 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 370 may be utilized to store a program. Memory 370 may also comprise a memory controller for accessing computer readable-medium 380 that may carry and/or make accessible content, which may include code, and/or instructions, for example, executable by processing unit 350 and/or some other unit, such as a controller and/or processor, capable of executing instructions, for example.

Under direction of processing unit 350, memory, such as memory cells storing physical states, representing, for example, a program, may be executed by processing unit 350 and generated signals may be transmitted via the Internet, for example. Processing unit 350 may also receive digitally-encoded signals from client computing device 312.

Network 315 may comprise one or more network communication links, processes, services, applications and/or resources to support exchanging communication signals between a client computing device, such as 312, and computing device 316 ('third device' in figure), which may, for example, comprise one or more servers (not shown). By way of example, but not limitation, network 315 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store content, such as measurements, text, images, video, audio, etc. in the form of signals and/or states. Thus, a computing device, in this context, may comprise hardware, software, firmware, or any combination thereof (other than software per se). Computing device 310, as depicted in FIG. 1, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) players and/or recorders, game consoles, satellite television receivers, cellular telephones, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 370 may store cookies relating to one or more users and may also comprise a computer-readable medium that may carry and/or make accessible content, including code and/or instructions, for example, executable by processing unit 350 and/or some other unit, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be compliant and/or compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
generating cross-domain recommendations for presentation to one or more users based at least in part on real-time web browsing, on a list of Web sites or Web pages visited by the one or more users, and on structured and/or semi-structured parameters stored in memory and extracted from one or more Web sites or Web pages visited while browsing, the generating comprising identifying semantic bridges for use in generating the cross-domain recommendations, wherein
identifying semantic bridges comprises populating an ontology based, at least in part, on the list of Web sites or Web pages visited by the one or more users and on the structured and/or semi-structured parameters extracted from the one or more Web sites or Web pages visited while browsing.

2. The method of claim 1, wherein the generating comprises creating feature signal vectors for use in machine learning, wherein the feature signal vectors are based at least in part on the list of Web sites or Web pages visited by the one or more users and on the structured and/or semi-structured parameters extracted from the one or more Web sites or Web pages visited while browsing.

3. The method of claim 2, wherein the feature signal vectors comprise one or more classes of non-relevant and/or relevant resources.

4. The method of claim 2, wherein the feature signal vectors are based at least in part on similarity among semantic types.

5. The method of claim 1, wherein the recommendations for presentation to one or more users are based at least in part on results of machine learning generated from the real-time web browsing.

6. The method of claim 5, wherein the machine learning comprises SVM.

7. An apparatus, comprising:
one or more processors to:
generate cross-domain recommendations for display based at least in part on real-time web browsing of a user, on a list of Web sites or Web pages to be visited by the user, and on structured and/or semi-structured parameters to be stored in memory and to be extracted from one or more Web sites or Web pages visited by the user, the generated cross-domain recommendations to comprise identification of semantic bridges via populating an ontology based, at least in part, on the list of Web sites or Web pages visited by the user and on the structured and/or semi-structured parameters to be extracted from the one or more Web sites or Web pages visited by the user.

8. The apparatus of claim 7, wherein the one or more processors are further to generate feature signal vectors to be used in connection with a machine learning process, wherein the feature signal vectors are to be based at least in part on the list of Web sites or Web pages visited by the user and on the structured and/or semi-structured parameters to be extracted.

9. The apparatus of claim 8, wherein the feature signal vectors are to be based at least in part on similarity among semantic types.

10. The apparatus of claim 7, wherein the recommendations are to be based at least in part on machine-learned results to be generated from real-time web browsing.

11. An apparatus comprising:
means for generating cross-domain recommendations for presentation to one or more users based at least in part on real-time web browsing, on a list of Web sites or Web pages visited by the one or more users, and on structured and/or semi-structured parameters stored in memory and extracted from one or more Web sites or Web pages visited while browsing, the means for generating cross-domain recommendations comprising means for identifying semantic bridges, the means for generating cross-domain recommendations to comprise means for populating an ontology, based, at least in part, on at least the list of Web sites or Web pages visited by the one or more users and on the structured and/or semi-structured parameters extracted from the one or more Web sites or Web pages visited while browsing.

12. The apparatus of claim 11, wherein the means for generating cross-domain recommendations for presentation comprises means for determining feature signal vectors for use in machine learning, the feature signal vectors to be based at least in part on the the list of Web sites or Web pages visited by the one or more users and on the structured and/or semi-structured parameters extracted from the one or more Web sites or Web pages visited while browsing.

13. The apparatus of claim 11, wherein the means for generating cross-domain recommendations for presentation further comprises means for determining similarity among semantic types of the structured and/or semi structured parameters extracted from the one or more Web sites or Web pages visited while browsing.

14. The apparatus of claim 11, further comprising means for recommending for presentation to one or more users based at least in part on machine-learned results generated from the real-time web browsing.

* * * * *